June 15, 1954
L. D. BURCH
2,680,950
DIRECT REACTION ROTARY TRANSLATION ENGINE
Original Filed July 19, 1945
6 Sheets-Sheet 2
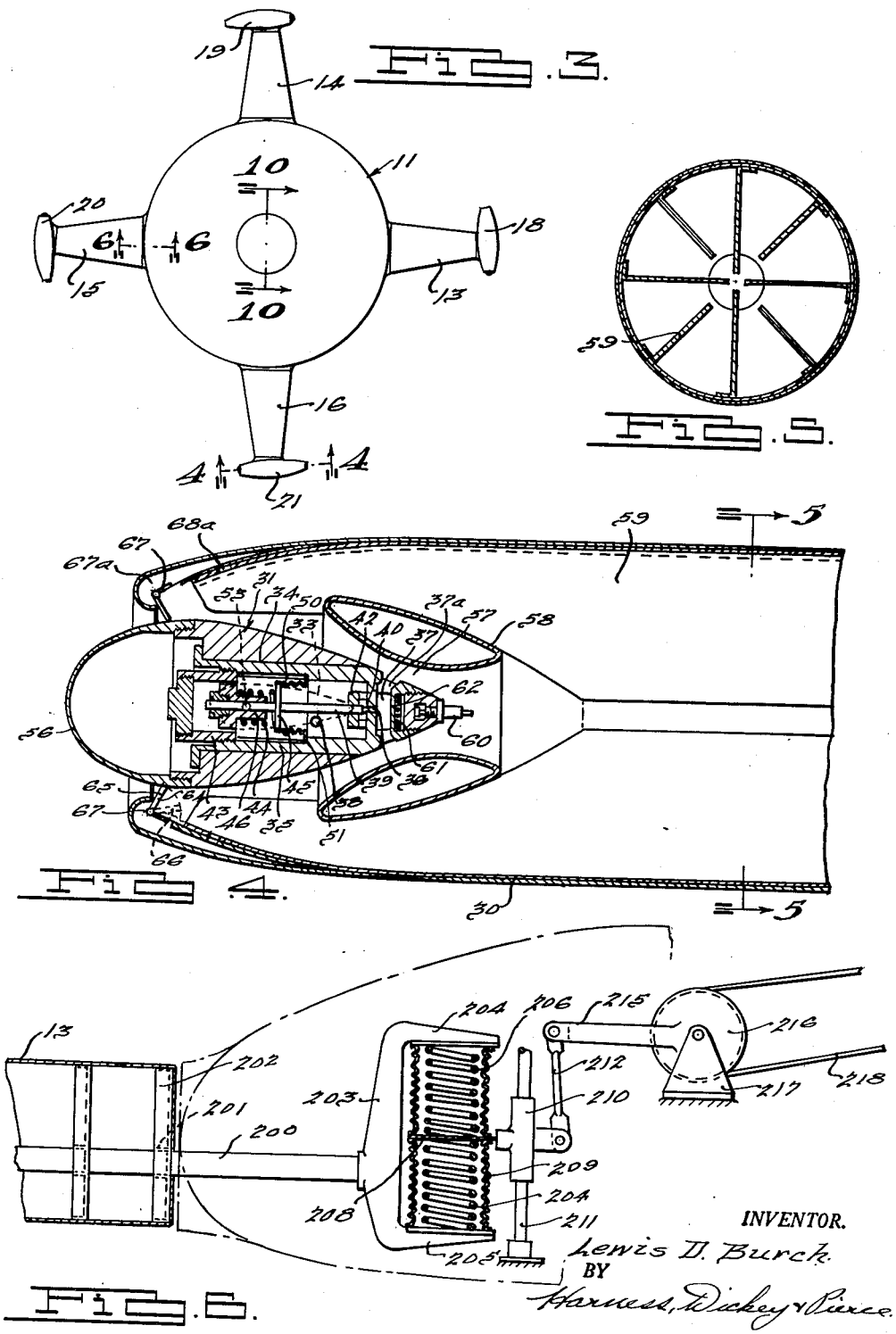
INVENTOR.
Lewis D. Burch
BY
Harness, Dickey & Pierce
ATTORNEYS.

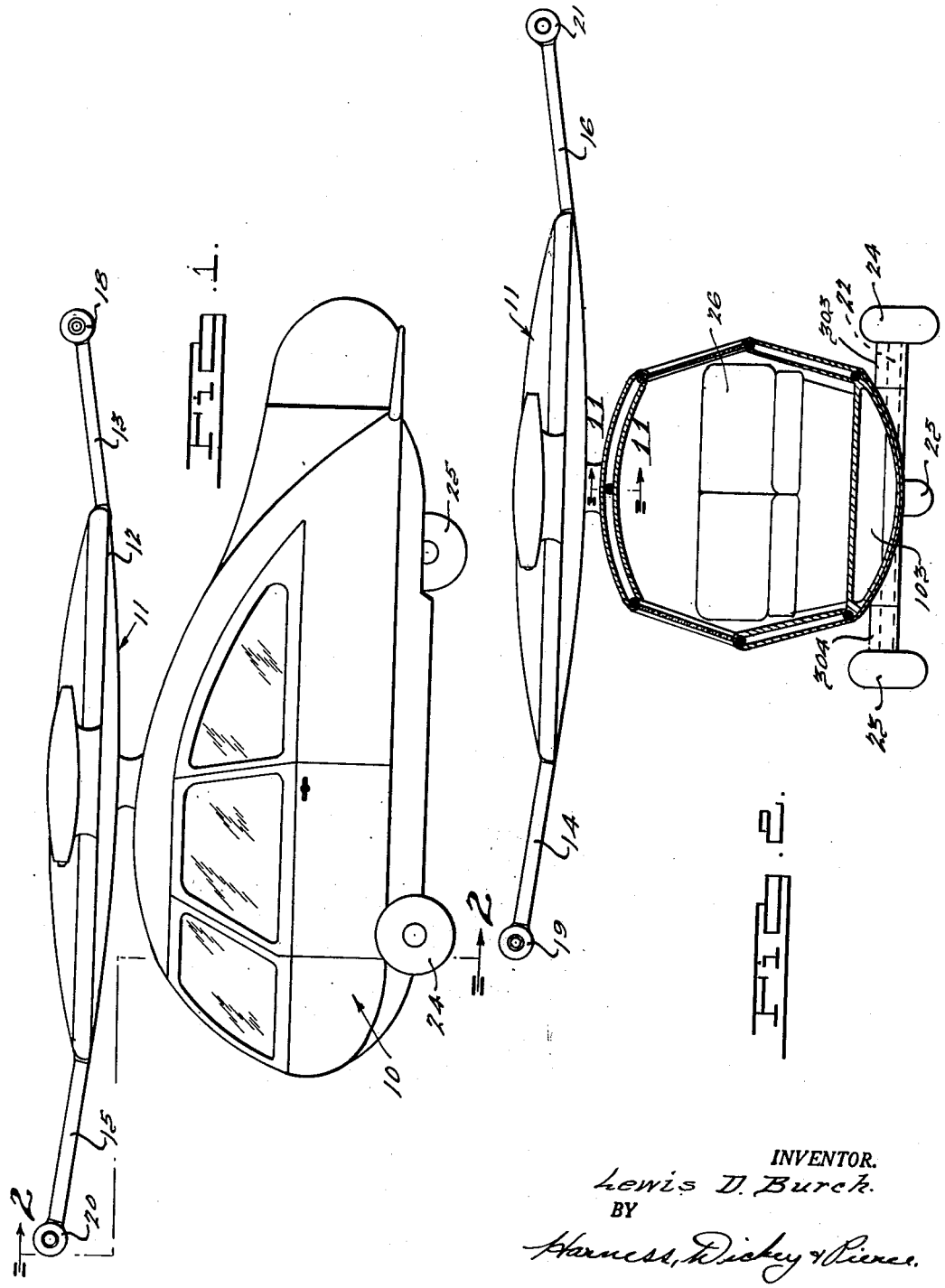

June 15, 1954 — L. D. BURCH — 2,680,950
DIRECT REACTION ROTARY TRANSLATION ENGINE
Original Filed July 19, 1945 — 6 Sheets-Sheet 3

INVENTOR.
Lewis D. Burch.
BY
Harness, Dickey & Pierce
ATTORNEYS.

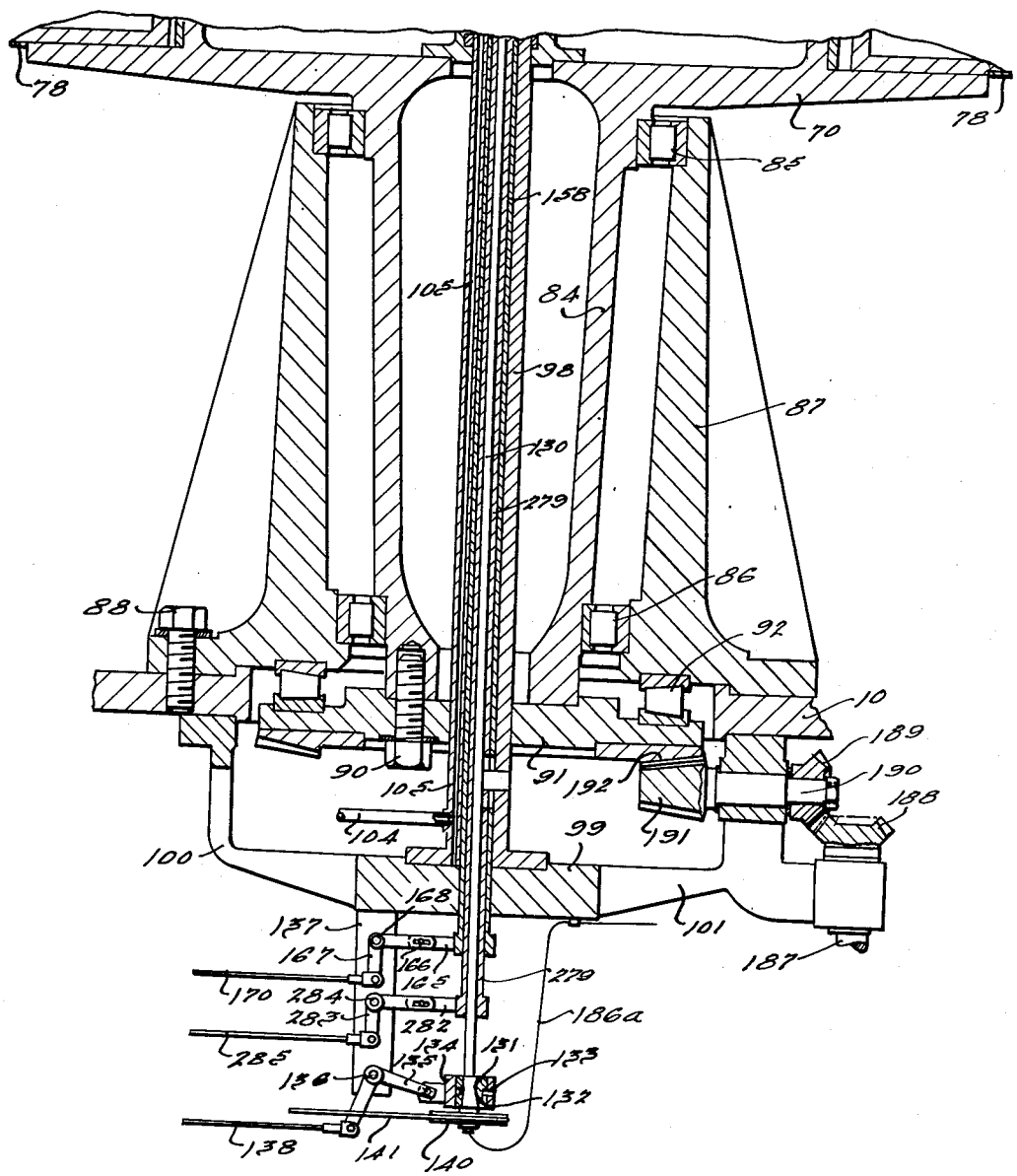

June 15, 1954
L. D. BURCH
2,680,950
DIRECT REACTION ROTARY TRANSLATION ENGINE
Original Filed July 19, 1945
6 Sheets-Sheet 6
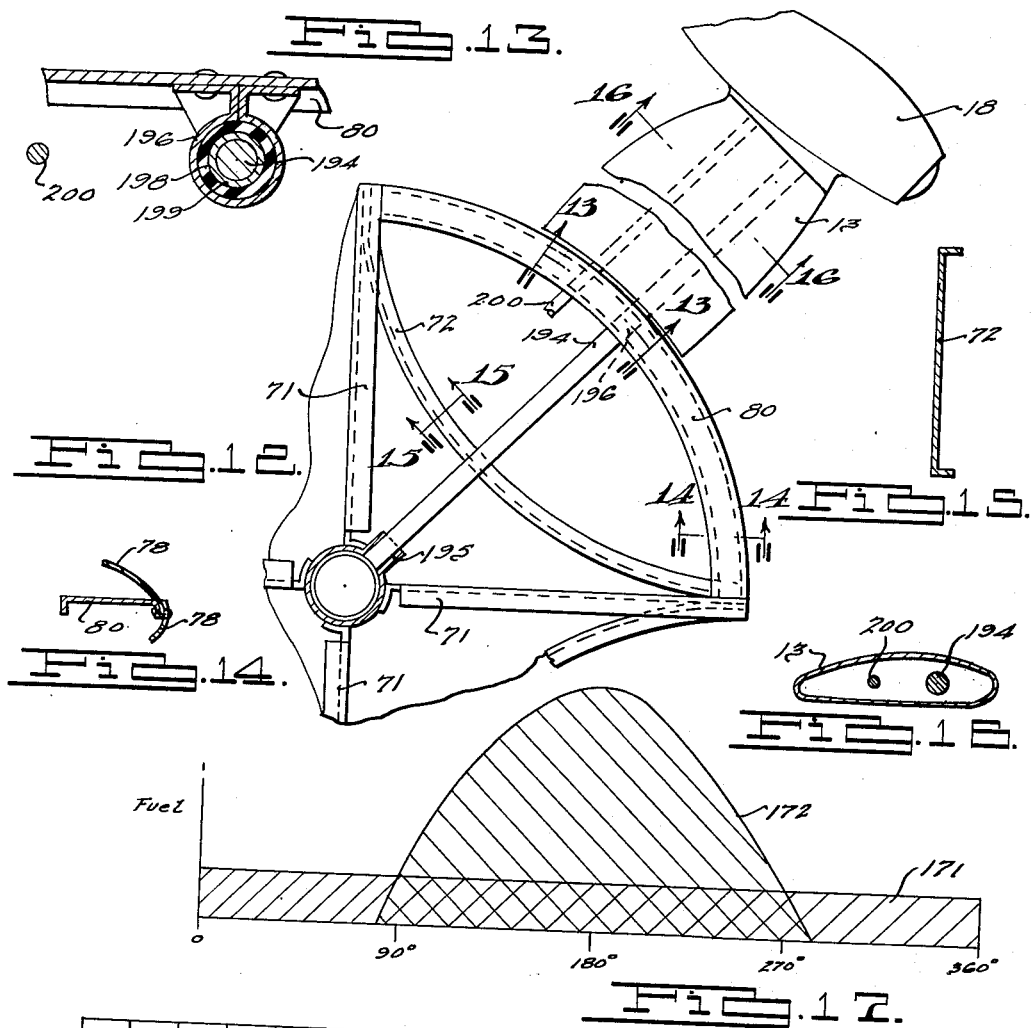
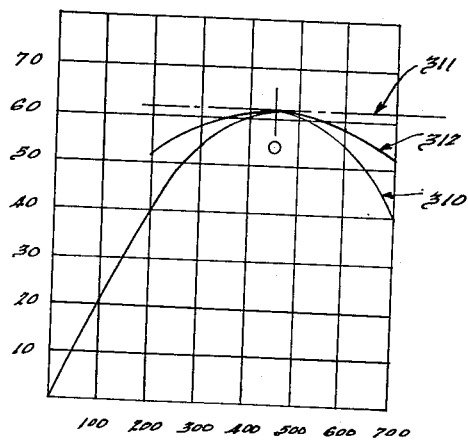
INVENTOR.
Lewis D. Burch.
BY
Harness, Dickey & Pierce.
ATTORNEYS.

Patented June 15, 1954

2,680,950

UNITED STATES PATENT OFFICE 2,680,950

DIRECT REACTION ROTARY TRANSLATION ENGINE

Lewis D. Burch, Detroit, Mich.

Continuation of application Serial No. 606,013, July 19, 1945. This application December 18, 1946, Serial No. 716,922

19 Claims. (Cl. 60—39.34)

The invention relates to direct reaction engines to be used for any desired purpose and particularly to direct reaction rotary internal combustion engines provided with wings and capable of flight as a new type rotary wing aircraft.

Heretofore engines for producing rotary motion have been employed primarily for the development of power with the application of the power to obtain translatory motion being the function of some other device, as for example, the propeller in aircraft; the propeller in boats, the transmission, differential, and wheels in automobiles, and the wheels and driving linkage in locomotives.

The engine here described develops and applies power by direct reaction to do work involving either rotary motion or rotary and translatory motion and has therefore many novel applications either as a stationary engine merely for producing power or as a mobile unit for carrying loads, whether on land, on water or in air.

In the illustrated embodiment of the invention, the engine is provided with wings for lifting it in the air and with this function performed the engine thereafter is capable of independent flight and of performing all known aerial maneuvers, this being a result of the direct reaction forces inherent in the operation of the engine.

Some of the objects of the invention are to provide an improved, simplified and efficient direct reaction engine of general application; to improve the efficiency and simplify the problem of developing and applying power; to provide a new and direct method of producing translatory motion; to apply the principle of direct reaction to slower, safer and more useful speeds; to provide an engine which by a direct application of its own power is capable of sustained flight; to provide an aircraft for any use but particularly for individual or family use, which can be constructed cheaply, will operate safely and efficiently, will be easy to operate and to learn to operate, can be operated without the necessity for airports and ground and flight control personnel and by the utilization of which any portion of the earth's surface may be made directly accessible.

In the drawings:

Fig. 1 is a side elevational view of an aircraft powered by an airwheel type of direct reaction rotary internal combustion engine constructed according to one form of the present invention;

Fig. 2 is a view partly in elevation and partly in cross section taken substantially on line 2—2 of Fig. 1;

Fig. 3 is a plan view on a smaller scale of the airwheel shown in Fig. 1;

Fig. 4 is a cross sectional view on a larger scale through a forward portion of one of the direct reaction devices or engines employed in the airwheel shown by the preceding figures and taken substantially along the line 4—4 of Fig. 3;

Fig. 5 is a cross sectional view taken substantially along line 5—5 of Fig. 4;

Fig. 6 is a cross sectional view taken substantially along line 6—6 of Fig. 3;

Fig. 11 is a cross sectional view on a larger scale of another portion of the operating mechanism and the bearing for the airwheel, taken substantially along line 11—11 of Fig. 2;

Fig. 12 is a fragmentary plan view of the frame structure employed in the airwheel with the upper covering therefor removed, and of a portion of one of the wings and reaction devices embraced therein. A portion of the structure at the center is taken on a plane somewhat below the remainder thereof in order to show the means for securing the inner end of one of the wing spars;

Fig. 13 is a cross sectional view on a larger scale taken substantially along line 13—13 of Fig. 12;

Fig. 14 is a cross sectional view taken substantially along line 14—14 of Fig. 12;

Fig. 15 is a cross sectional view taken substantially along line 15—15 of Fig. 12;

Fig. 16 is a cross sectional view taken substantially along line 16—16 of Fig. 12;

Fig. 17 is a graph illustrating variations in the performance of one of the direct reaction devices during one revolution thereof and under different operating conditions; and Fig. 18 is a graph showing possible variations in wing performance under different conditions of operation.

Figure 7:
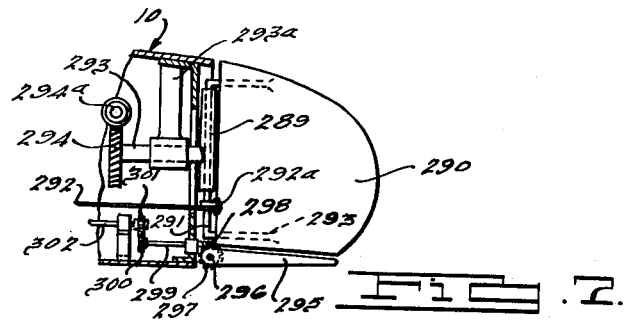
Fig. 7 is a fragmentary, partly cross sectional, view of flight control means at the rear end of the cabin.
Figure 8:
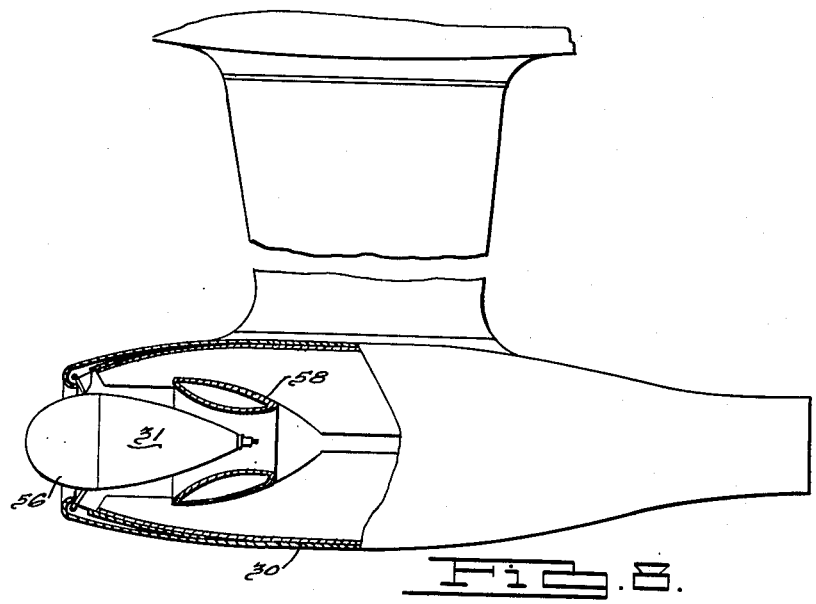
Fig. 8 is a plan view, partly in cross section and with a portion thereof broken away, of one of the rotating wings and the reaction device mounted on its outer end.
Figure 9:
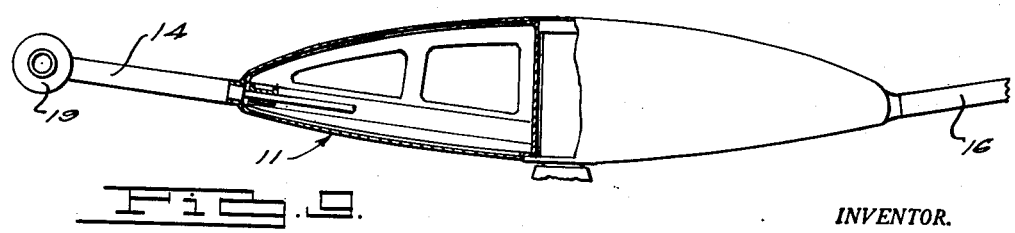
Fig. 9 is a side elevational view having a portion thereof in cross section of the airwheel structure shown by the preceding Figs. 1, 2 and 3.

Referring now to Figs. 1, 2 and 3, there is illustrated, the fabricated structure or body of a direct reaction rotary translation internal combustion engine or airwheel 11. Beneath the engine 11 is a cabin 10 which in the illustrated embodiment of the invention rotatably supports the engine 11 upon a bearing or engine support 87. In flight the cabin is suspended in the slip steam beneath the engine 11.

The engine or body 11 comprises a centrally disposed disc or casing 12 of circular airfoil formation from which projects radially disposed reaction device supports or wings, 13, 14, 15 and 16. Also comprising the engine or body 11 are direct reaction devices or ram-jet engines 18, 19, 20 and 21 supported respectively by the wings or supports 13, 14, 15 and 16. From the combustion-expansion chambers of these engines the working fluid for rotating the body or engine 11 on its axis of rotation within bearing 87 is discharged in tangential relation thereto.

The cabin 10 when on the ground merely supports the light fabricated structure of the engine 11, and during flight is merely suspended beneath the engine 11. Hence the cabin 10 is not subject to enormous stress and shock forces to which the fuselage portions of other types of aircraft are subject. Also unlike an automobile body, the cabin 10 does not encounter the continuous shock and stress forces that are involved in travel upon a concrete highway at speeds approaching 100 miles an hour and therefore does not simultaneously have to withstand the stress and strain forces involved in braking and power transmission which affect an automobile body during such operation. Since the principal function of the cabin 10 is carrying its own weight and passengers, freight or fuel, it is more analogous to a market basket which under comparable conditions is capable of carrying many times its own weight.

The cabin 10, therefore, is constructed according to the simple tube and sheet construction shown by Fig. 2 and without the usual number of reinforcing ribs, struts, braces, angles, frames, channels, etc., normally emloyed in automobile body and aircraft fuselage designs.

Since the weight of the aircraft is very low, the operation of the engine practically without vibration, and the craft lands easily at low or zero landing speed, the landing gear may also be made simple and inexpensive. To meet such end there is employed a light, flexible, metallic tube 22 fastened to the cabin along an intermediate portion thereof and having rotatably mounted at opposite ends thereof large low pressure pneumatic wheels 23 and 24.

Universally mounted for rotation in an impression formed at the rear of the cabin 10 is a third such wheel 25, the three wheels and the flexible shaft 22 being capable of landing the relatively light craft under normal operating conditions.

Seats 26, wide enough to seat three average sized persons and spaced one in front of the other in the cabin, occupy practically the whole interior of the cabin except for space provided at the front for controls, at the rear for baggage, and beneath the floor where a fuel tank 103 is located.

The bottom of the cabin is constructed in such manner as to float in water so that the craft, if so desired, may take off and land in such medium. It is unnecessary in such circumstances to retract the landing wheels or gear.

The shape of the cabin 10 is such that the front of the cabin will tend to lift in the slip stream to a greater extent than the rear, thereby tending to balance the counter-rotational effect of the drag on the cabin.

At the front the cabin 10 is provided with ailerons 303 and 304 mounted for angular movement on the tube 22 between the wheels 24 and 23, respectively, and adjacent depressed portions of the cabin 10.

The rear of the cabin 10 is provided with a horizontal control member 295 (Fig. 7) supported on a shaft 296 having a worm wheel 297 meshing with a worm 298 on the end of a shaft 299 rotatably mounted in the adjacent cabin wall. Shaft 299 at its opposite end carries gear 300 meshing with gear 301 secured on the rear end of actuating rod 302. When the rod 302 is rotated in opposite directions by the aircraft operator control member 295 is moved upwardly or downwardly in the aircraft slip stream.

The control member 295 has a V-shaped cutout portion (not shown) midway between the ends thereof to receive and to permit the angular movement of vertically disposed control member 290 which in turn is supported on a U-shaped rod 291, the middle portion of which is positioned in spaced relation along the front edge of the member 290. Such midportion of the rod 291 is rotatably mounted within a tubular member 289 at an intermediate portion thereof on the rearwardly disposed end of a shaft 293 rotatably mounted in a bearing 293a secured at its upper end in a vertically disposed stabilizing fin portion of the cabin 10. The forward end of the shaft 293 carries a worm wheel 294 meshing with a control shaft operated worm 294a. When the operator operates the control shaft to rotate the worm 294a in opposite directions the control member 290 will be moved into different angular positions in either direction from its normal vertical position and about the axis of rotation of the shaft 293. The control member 290 also may be moved into various angular positions upon the axis of the midportion of the rod 291 by the movement of arm 292a, having one end thereof secured to the rod 291 and the opposite end pivotally fastened to control rod 292.

Figure 10:
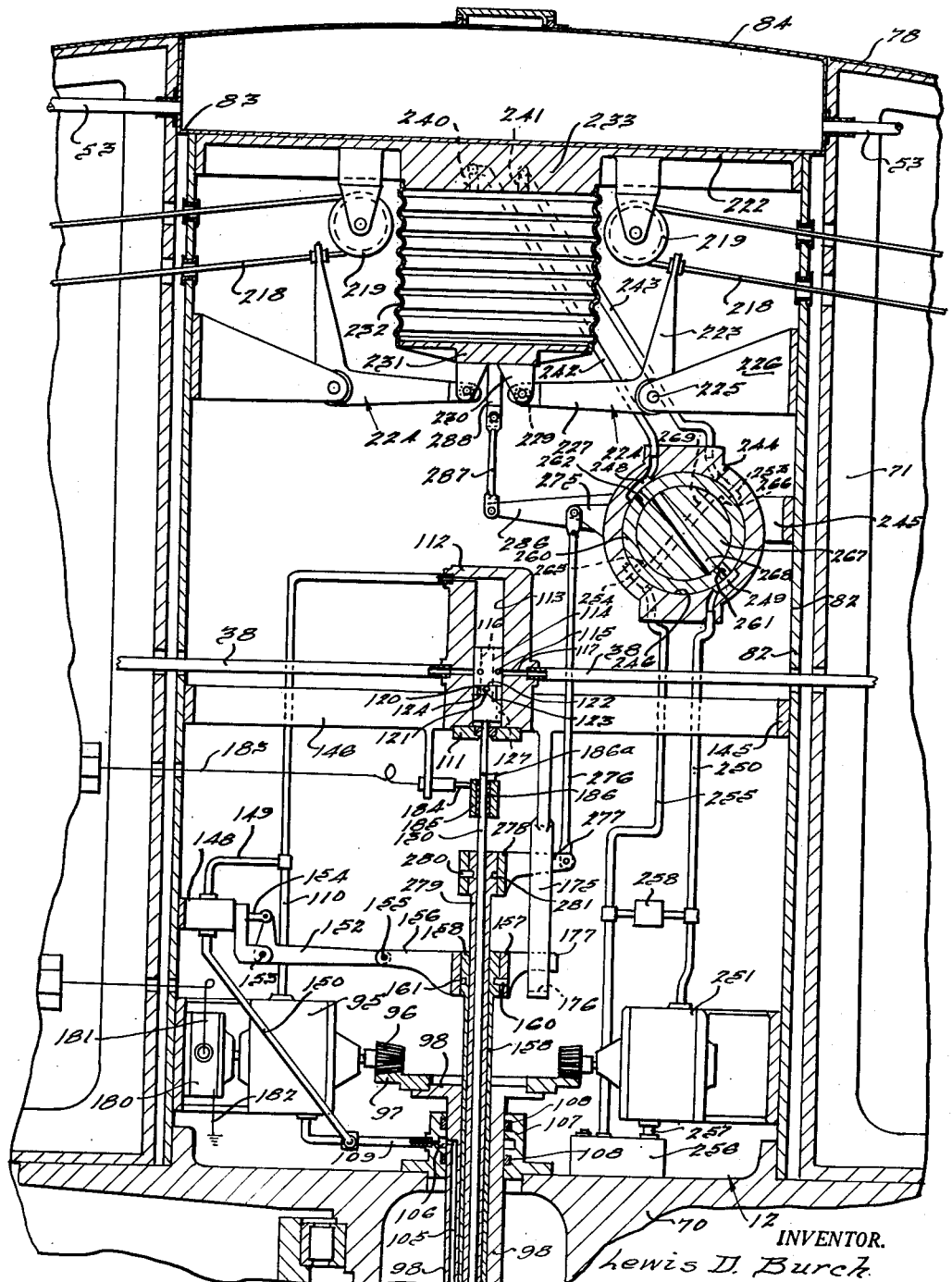
Fig. 10 is a cross sectional view on a larger scale of a portion of the operating mechanism employed in the airwheel, taken substantially along the line 10—10 of Fig. 3.

Referring to Figs. 10 and 11, the bearing member 87 will be seen to be secured by screws 88 over an opening formed in a supporting ring portion of the cabin 10. Through bearing member 87 and into this opening projects bearing member 84 containing the axis of rotation of the engine 11 and the disc 12 and upon the upper flange end of which the disc or casing 12 of the engine 11 is rigidly secured. Roller bearings 85 and 86 are provided for rotatably supporting the bearing members 84 and 87 relative to one another. Thrust ring 91 secured by screws 90 to the lower end of bearing member 84 engages roller thrust bearing 92, which in turn engages the lower end of bearing member 87 to apply the axial thrust of the engine for supporting the cabin 10 in flight.

Annular bracket 100 having an offset bearing portion 101 formed at one side thereof is rigidly secured to the lower side of the previously mentioned supporting ring portion of the cabin 10. The shaft 187 of an electric generator-starter (not shown) is rotatably mounted in a vertically disposed bearing formed in the bearing portion 101, and beyond the bearing portion carries a bevelled pinion 188 meshing with a like pinion 189 secured on the end of a shaft 190, which in turn is similarly mounted in a horizontally disposed bearing formed in the bearing portion 101. Beyond this latter bearing, a shaft 190 carries a second bevelled pinion 191 meshing with a bevelled ring gear 192 rigidly secured to the lower side of thrust ring 91. A central boss portion 99 of the bracket 100 provides a support and bearing member for the engine control mechanism to be hereafter described.

The disc, rotary stabilizer or engine casing 12 is of circular airfoil formation, the plane of rotation of which normally includes the line of flight of the engine. Except for such disturbances in the flow of air beneath the disc as may be caused by the down draft from the wings and the upwardly directed flow of air over the cabin, a vertical section through the diameter of the disc would appear in outline as an ellipse with the minor axis thereof being the axis of rotation of the disc and the major axis being included within the plane of rotation thereof. Some slight variation from this cross sectional outline may be found advisable to compensate for such disturbances so as to provide a neutral airfoil structure in which the aerodynamic forces affecting the upper and lower surfaces of the disc are in equilibrium during translatory flight in a line of flight included in the plane of rotation of the disc.

In addition to providing a rigid support for the wings, the disc also acts as a rotary horizontal stabilizer for the entire aircraft. While presenting only a minimum of resistance or drag opposing translatory flight of the aircraft in its plane of rotation and that of the engine as a whole, nevertheless it does offer considerable resistance to any tendency to making abrupt and intermittent movements normal to such plane, whether such movements be parallel to the normal line of flight or at an angle thereto.

One of the causes which tends to impart to the disc or stabilizer a definite propensity for stabilized movement in the line of flight of the aircraft is the equilibrium of all of the aerodynamic forces which might tend to cause variation from the line of flight of the plane of rotation of the disc.

Another of such causes is the gyroscopic effect resulting from the rotating mass of the engine.

For example, the gyroscopic effect would readily permit any vertical movement of the disc involving angular displacement of the axis of rotation thereof. Such movement, however, would tend immediately to disturb the equilibrium of the aerodynamic forces affecting the disc and hence would be opposed by such forces. On the other hand, a gust of wind producing a variation in relative air speeds affecting different portions of the disc surface might readily disturb the equilibrium of aerodynamic forces affecting the disc, thereby tending to cause angular displacement in the axis of rotation of the disc. This would tend to produce either precession of the axis of rotation of the disc, or a slight movement of the entire plane of rotation of the disc sufficient to reestablish the equilibrium of aerodynamic forces so disturbed, or some combination of such movements. However, due to the mass of the engine, the centrifugal and gyroscopic effects involved in its rotation, and the considerable time element involved in any precessional movement of the disc, it will be apparent that the disturbance in the equilibrium of aerodynamic forces caused by the gust will be corrected by an equalizing movement in the air long before any measurable movement of the plane or axis of rotation of the disc may occur.

As a support for the wings, the disc 12 also has some very advantageous properties. Comparing these wings with wings of conventional rotary wing aircraft supported near the center of rotation, it will at once be apparent that the disc prevents the use of a considerable portion of the rotary wing surface adjacent the center of rotation and from which surface some lift ordinarily is obtained. However, it is believed that the advantage gained in using the disc as a wing support far outweighs this loss in lift.

For example, it is possible by the employment of a disc 4 feet in radius and wings 4 feet in length to obtain a total lift as great as might be obtained from wings extending from the center of rotation and several times greater in length. This will be more apparent when it is considered that the outer 4 feet of an ordinary rotary wing 16 feet in length lifts 40% or more of the total load carried by the wing. If this outer 4 feet be brought near the center of rotation and fastened to some support such as the disc 12, its cord can be increased considerably, its thickness increased slightly and its speed greatly increased, until a 4-foot length of wing will carry the entire load formerly carried by the 16-foot length of wing. This can be done without creating vibrations of anything like the intensity that would have occurred in the 16-foot wing hinged at or near the center of rotation.

Referring to Figures 9, 10, 12, 13, 14, 15 and 16, it will be noted that structurally the disc 12 comprises an inner fabricated frame consisting of a centrally and axially disposed casing 82 having attached thereto four equally spaced, radially disposed, flanged beams 71, the outer ends of which are attached to a circumferentially disposed channel member 80. Four arcuate struts 72 are secured at opposite ends between the outer ends of the beams 71 for circumferentially reinforcing the structure. A thin metallic covering secured over these frame members not only provides an outer covering for the disc but by reason of the approximately elliptical form of the covering, absorbs the centrifugal forces generated therein during the rotation of the disc and at the same time reinforces the frame by aiding in the circumferential distribution of the various forces resulting from the rotation of the entire engine structure.

The four wings 13, 14, 15 and 16 are supported by the disc 12 upon four radially disposed metallic spars or tension members 194, secured rigidly at their inner ends in cylindrical flanges 195 projecting radially outwardly from the casing 82. The angular position of the spars 194 is such that the spars intersect the plane of rotation of the disc in the vicinity of the periphery thereof and from such intersection extend upwardly at about the angle the wings would normally assume under the combination of the centrifugal, lift and drag forces affecting the wings under average conditions of flight. Under other than such conditions the spars 194 will bend sufficiently to permit the wings to assume any position in which all of these forces will be in equilibrium.

In order to permit this slight movement, the spars are supported at the periphery of the disc 12 by flexible shackles or brackets 196 secured rigidly to the circular channel 80 midway between the outer ends of adjacent pairs of the radial beams 71. These brackets include annular cylindrical cushions 198 formed of rubber or other suitable material and vulcanized at their exterior and interior surfaces respectively to the brackets 196 and tubular bearings 199, the interior surfaces of which support the spars 194.

The wings 13, 14, 15 and 16 are mounted for oscillatory movement on the portions of the spars 194 extending beyond the brackets 196 and the periphery of the disc 12, in bearings formed on the wing ribs.

Beyond the outer ends of the wings 13, 14, 15 and 16, the spars 194 have rigidly secured thereto respectively the direct reaction devices or ramjet engines 18, 19, 20 and 21.

The engines, combustors or power generating means 18, 19, 20 and 21 each comprises an elongated tubular combustion-expansion chamber formed by a wall or casing 30, the shape of which is such as to provide a minimum of resistance to rotational movement about the center of the disc 12. The forward end of each of the casings 30 is provided with an axially disposed opening having a valve body 31 projecting therein in such manner as to form with the casing end an annular inlet opening for the ram compression of air into the casing 30 when the device is rotated about the center of the disc 12. The casing is secured in such position by transversely disposed struts projecting inwardly from the chamber wall. The inlet opening for the casing of each engine may be closed by arcuate shutters 64, the edges of which circumferentially meet when the shutter valve is in the closed position indicated by numeral 65 and separate when the shutter valve is in the open position indicated by the numeral 66. The shutters 64 are pivotally mounted on a shutter supporting ring as indicated at 67, the latter being secured within the forward end of the casing 30 on spaced and radially disposed supports 67a fastened therein in any suitable manner.

As will be noted from Figs. 4 and 6, each of the casings 30 comprises outer and inner sections, the latter being of progressively decreasing diameter toward the forward end of the structure to streamline the flow of air admitted to the chamber and to provide a pressure chamber behind the shutters to aid in closing the shutters when the pressure inside the casing 30 exceeds that externally thereof. To permit such pressure to affect the rear of the shutters, the inner reduced section of the casing 30 terminates in such manner as to provide a stop for the ends of the shutters but does not shield the main portions of the inner surfaces thereof. The pressure is so communicated to the interior of the pressure chamber by a plurality of openings indicated at 68a.

The rear ends of the engines 18, 19, 20 and 21 are reduced in diameter to provide discharge openings or jets through which the working fluid employed in the engines is discharged into the atmosphere. The cross sectional area of these openings or jets is greater than the annular inlet openings through which air is admitted to the combustion-expansion chambers of the engines.

Inside the casings 30 is secured a plurality of radially disposed fins 59, the forward ends of which are cut out to provide inlet passages in which the valve bodies 31 are positioned and in which annular Venturi members 58 are located and supported upon the fins 59 about the tapered rear end portions of the valve bodies 31. The venturis 58 are so located with respect to valve bodies 31 and the casings 30 as to divide the inlet passages into passages for primary air inside the venturis and passages for excess air outside the venturis. The passages for primary air are reduced in cross section by tapering ends of the valve bodies projecting into the venturis 58 to provide Venturi throats 57, where the velocity and pressure for the primary air for each engine reaches its maximum and minimum values respectively.

In order to supply hydrocarbon or other fuel to the primary air supplied to each of the combustion chambers, to provide a combustible charge therein, the rear end of each valve body is divided by webs 37a to provide a transversely disposed atomizing chamber 37, the outer extremity of which terminates in the Venturi throat 57 of each engine. A fuel atomizing orifice 36 formed in the end of a flanged valve casing 35 secured in a cylindrical opening 34 formed in each valve body 31 supplies variable quantities of the fuel employed to the atomizing chambers 37. Opposite the orifices 36 the atomizing chambers have vaporizing walls 62, beyond which are located electric heating coils 61. These coils may be employed when starting the engines, or at all times if desired, for heating the walls 62 whereby at least some of the fuel directed thereagainst by the orifices 36 will be vaporized.

Beyond the heating coils 61 at the rear ends of the valve bodies 31 are spark or glow plugs 60 which serve to ignite the charges formed by the fuel and primary air at the rear ends of the venturis 58. Beyond the venturis 58 the charges burn and expand, thereby heating and expanding the excess air introduced into the combustion chambers around the outside of the venturis. The working fluid so provided is discharged from the chambers to the atmosphere tangentially with respect to the body or engine 11, and the reaction thereto, due to the greater interior area exposed to the working fluid at the front ends of the casings 30 than at the rear ends thereof, rotates the body or engine 11 upon its axis rotation within the bearing 87.

In order to be able to control and to vary the fuel supplied by the orifices 36 there is provided within the valve casings 35 needle valves 39 having tapering ends 40 adapted to seat upon the inner edges of the orifices 36 for metering the flow of fuel thereto. Adjacent the tapering ends thereof the valves 39 are slidably supported by guide members 42 while the opposite ends thereof are similarly supported by guide members 46 formed as a part of threaded end closure members 43 employed for closing the front ends of the casings 35. The guide members 46 also support the forwardly disposed ends of valve springs 44, while the opposite ends of the springs engage discs 45 fastened upon intermediate portions of the valves 39. The space inside each of the valve casings 35 is divided into a fuel chamber and a fuel pressure equalizing chamber by bellows 50, the opposite ends of which are secured to the edges of discs 45 and to annular shoulders formed on the inside surfaces of the valve casing 35. The valve bodies 31 have hollow removable front end portions 56 for providing access to the valve mechanisms disposed interiorly thereof.

The fuel chambers, which communicate with orifices 36 formed in the valve casings 35, are supplied with fuel by conduits 33, the opposite ends of which in turn communicate with ports 117 of fuel distributing valve 112, the latter being located at the axis of rotation of the engine 11 within the central portion of the casing 82.

In order to neutralize the effect of centrifugal force upon the fuel within the fuel chambers of the valve casings 35 supplied by the conduits 33, the pressure equalizing chambers within the valve casings 35 all are connected by conduits 53 to a static liquid supply chamber 83, the upper end 84 of which provides a portion of the exterior covering of the disc 12. The supply chamber 83 is supported at the center of the disc 12 upon the upper end of head portion 222 of the casing 82. The chamber 83 is provided with any suitable means for exposing the interior thereof to atmospheric pressure and for filling and refilling the chamber with any suitable liquid having a specific gravity comparable to that of the fuel employed.

During the rotation of the engine 11 the centrifugal force developed within the conduits 53 neutralizes and opposes that developed within the conduits 38, thereby avoiding the effect of centrifugal force upon surfaces of the discs 45. It is therefore possible to control the rate of discharge of fuel by the orifices by independently varying the pressure and quantity of the fuel supplied to the conduits 38 by the fuel distribution valve 112.

The valve 112 is supported for rotation with the disc 12 upon a ring 145 secured to the inside of the casing 82 and having radially disposed arms 146 formed integrally therewith the inner ends of which are secured to the valve casing. The casing has an axial cylindrical bore 113 in which is slidably and relatively rotatably mounted a valve piston 114, the lower end of which is secured upon the upper end of a control rod 130 projecting outwardly of the valve casing through a casing head 111.

The rod is slidably and rotatably supported within a tubular control member 279 which in turn is slidably supported inside a second tubular control member 158 which likewise is slidably supported within a tubular support member 98, the latter being secured rigidly at its lower end upon a central boss portion 99 of the bracket 100. Beneath the bracket the control rod 130 has secured thereto a circumferentially grooved collar 131 and beneath the collar a circumferentially grooved wheel 140. The wheel 140 is provided with an actuating cable 141 for rotating the rod 130 and the valve piston in response to the will of the operator.

The collar 131 has secured thereon by a pin 133 engaging the circumferential groove formed thereon an actuating ring 134 having a boss projecting therefrom which is pivotally attached to an arm of a bell crank lever 135. A pin 136 pivotally supports the lever 135 upon a support bar 137 projecting downwardly from the boss portion 99 of the bracket 100. The opposite arm of the lever 135 is pivotally attached to an actuating rod 138 by means of which the operator may move the rod 130 vertically for moving the valve piston 114 axially within the bore 113.

The upper portion of the valve piston 114 is provided with an axial cylindrical opening 116 the lower end of which is in communication through radial openings 121 with an annular opening 120 formed around an intermediate portion of the valve piston. An intermediate portion of the axial opening 116 also communicates with the exterior of the valve piston 114 through a plurality of radially disposed openings 115.

In the present instance there are five of the radially disposed openings 115 all in the same plane of rotation and all equally spaced from one another. These openings 115 in the position of the valve shown by Fig. 10 are located in the same plane with valve ports 117 formed in the casing of the valve 112 and are adapted successively to communicate with each of these ports. Since there are four of the ports 117 spaced at 90 degrees about the valve casing it will be apparent that in one revolution or cycle of the engine 11 there will be twenty instances spaced equally from the standpoint of time in which the bore 113 of the distributing valve 112 will communicate with the fuel supply chambers of the engines 18, 19, 20 and 21 communicating with the orifices 36.

The annular opening 120 is formed by an upper edge portion 122 of the valve piston 114 which is disposed normally with respect to the axis of the piston 114. The opposite edge of the opening 120 is formed by an edge portion 124 extending normally with respect to said axis and an edge portion 123 disposed at an angle with respect thereto. The annular opening 120 also is in open communication with the lower end of the valve piston 114 through a bleeder opening 127, this latter opening being provided in order to equalize the pressure on opposite ends of the valve piston 114 to permit the piston to be easily moved axially within the bore.

It will be apparent from the foregoing description that the operator may move the valve piston 114 to a position in which the openings 115 intermittently and successively communicate with the ports 117 or into a different position in which the annular opening 120 is in open communication with some or all of the ports 117. This may be done by the operator merely by moving the actuating rod 138, thus moving the bell crank lever 135 upon its fulcrum 136 to increase or decrease the elevation of the rod 130 and the valve piston 114.

Liquid fuel is supplied to the interior of the fuel distributing valve 112 for selective and variable distribution to the engines 18, 19, 20 and 21 by a supply conduit 110 communicating with a suitable fuel pump 95 secured by a supporting bracket to the inside of the casing 82 adjacent the lower extremity thereof. The pump 95 has a driving pinion 96 meshing with ring gear 97 supported upon the upper flanged end of the tubular supporting member 98.

Since the supporting member 98 does not rotate with the disc 12, by reason of its rigid support upon the bracket 100, it will be apparent that rotation of the pump 95 with the casing 82 of the disc 12 will cause rotation of the pump drive pinion 96 by the ring gear 97. In order to supply hydrocarbon fuel to the pump 95, the latter is provided with a supply conduit 109, the opposite end of which communicates with an annular channel 106 formed in a flanged collar 107 supported upon the flanged upper end portion 70 of the bearing member 84. The flanged collar 107 also is rotatably mounted upon an upper portion of the tubular supporting member 98 between the disc 70 and the ring gear 97. In order to prevent leakage of fuel from the annular channel 106, there is provided a pair of sealing rings 108, the two being located within the ring 107 on opposite sides of the channel 106. The channel 106 is supplied with hydrocarbon fuel by a duct 105 formed vertically within the supporting member 98 at one side thereof and the lower end of which is in open communication with a conduit 104 the opposite end of which in turn communicates with the fuel tank 103 located beneath the floor of the cabin 10.

In order to control the quantity of fuel delivered by the conduit 110 to the bore 113 of the fuel distributing valve 112, there is provided between the discharge conduit 110 and the supply conduit 109 a by-pass valve 148 which is secured to the casing 82 and which communicates with the aforesaid conduits 110 and 109 through conduits 149 and 150 respectively. The by-pass valve 148 is provided with a supporting bracket to which an actuating lever 152 is secured as at 153. One end of the lever 152 is secured to an actuating rod 154 for operating the by-pass valve 148 while the opposite end thereof is pivotally secured as indicated 155 to radially extending arm 156 projecting outwardly from a ring 157 which is mounted for rotation upon the enlarged upper end of previously mentioned tubular control member 158. In order to mount the ring 157 in position upon the upper end of the member 158 there is provided a pin 167 and a circumferential groove 161, the two being operatively associated with one another and the members 158 and 157 to accomplish such end.

In order to actuate the control member 158 for controlling the operation of the by-pass valve 148 there is provided at the lower end of the member 158 beneath the bracket 109 a radially projecting arm 165, the end of which is connected by a pin and slot structure indicated at 166, to one end of a bell crank lever 167. The lever 167 is operatively mounted upon a pin 168 projecting from the support bar 137. The opposite arm of the lever 167 is pivotally connected to an actuating rod 170 by means of which the operator of the craft may move the control member 158 upwardly or downwardly thereby actuating the bell crank lever 152 for variably opening or closing the by-pass valve 148.

It will be apparent from the structure described that the greater the opening of the by-pass valve 148, the less will be the quantity and pressure of the fuel supplied to the interior of the valve 112. Conversely, the further by-pass valve 148 is moved toward closed position, the greater will be the pressure and quantity of fuel admitted to the interior of the valve 112.

In order to provide for the electrical energization of the spark or glow plugs 60 for starting the operation of the engine 11, there is provided on an extension of the shaft of the pump 95 a magneto 180 which, like the pump 95, is mounted for rotation with the casing 82. The magneto is provided with ground conductor 182 and an electrical current supply conductor 181, the latter being divided into a plurality of conductors, one for each of the spark plugs 60. Since each of the plugs 60 is also grounded, it is apparent that the magneto will continuously furnish electrical energy for energizing the plugs 60 until the circuit provided by the conductor 181 is broken. Since the energization of the spark plugs 60 is necessary only during the starting of the engines 18, 19, 20 and 21, a switch for breaking the circuit through conductor may be provided if desired.

The coils 61 for vaporizing fuel discharged into the atomizing chambers 37 by the orifices 36 also are supplied with electrical energy by a divided conductor 183, the inner end of which is attached to a brush 184 supported upon a downwardly projecting rod formed integrally with one of the arms 146. The brush 184 engages and rotates about a collector ring 185 supported upon and insulated from control rod 130 by an insulating sleeve 186. The collector ring 185 is supplied with electrical energy by a conductor 186a, having one end attached to the ring 185 and from which end the conductor passes through an opening formed axially throughout the length of the rod 130 therebeneath and terminates within the cabin 10 where the conductor is connected to a storage battery or other suitable source of electrical energy (not shown). Both the battery and the heating coils 61 are grounded to the metallic frame of the structure for transmitting electrical energy through the other side of the line so formed. The battery may be connected to and charged by the starter generator unit previously mentioned at times during which the unit is being operated by the rotation of the engine 11 as a generator. The circuit of the heating coils 61 also may be provided with a suitable switch (not shown) by which the circuit therethrough may be made or broken when heat for vaporizing the fuel is required or not required, as the case may be.

In order to provide means for operating the wings 13, 14, 15 and 16 in such manner as to provide the lift and startability necessary to fly the engine 11 for carrying the cabin 10 in vertical and translatory flight, there is provided for each of the wings (Figs. 6, 12 and 16) operating rods 200 which are secured in flanged openings 201 formed in the wing ribs 202, longitudinally of the wings and adjacent the trailing edges thereof. The inner extremities of these rods 200 extend within the disc 12 where the ends thereof are secured rigidly to yokes 203 having upper and lower horizontal supporting ends 204 and 205, respectively. Pairs of springs 206 and 207 at opposite ends rest against the supporting portions 204 and 205, respectively, of the yokes 203, while the adjacent ends rest upon opposite surfaces of operating plates 208 secured at one edge to an intermediate portion of vertically disposed tubular slide members 210.

Guide rods 211 having the opposite ends thereof secured rigidly to upper and lower portions of the disc 12 engage the interior surfaces of the slide members 210 for holding the same in proper position for actuating the yokes 203. The slide members 210 are adapted to be moved vertically upon the rods 211 in response to the operation of grooved wheels 216 supported within the disc 12 by brackets 217 and having radially disposed arms 215 pivotally connected by rods 212 to boss portions projecting from the members 210.

The grooved wheels 216 are adapted to be rotated in opposite directions for actuating the slide members 210 by cables 218, the opposite ends of which extend radially inwardly to the interior of the casing 82 where they are there associated with a plurality of grooved wheels 219 supported by brackets extending downwardly from the casing head 222. In order to be able to move the cables 218 for changing the angles of attack of the wings 13, 14, 15 and 16, there is provided a servo-motor consisting of a flexible bellows 232 the upper end of which is supported by a boss 233 projecting downwardly from the central portion of the casing head 222. The opposite end of the bellows 232 is closed by a head 231 having four bifurcated brackets 230 extending downwardly therefrom in each of which an end 227 of four bell crank levers 224 are secured by pins 229. The bell crank levers 224 are pivotally supported at 225 by brackets 226 projecting radially inwardly from the adjacent wall of the casing 82. The opposite ends 223 of the levers are secured to the cables 218 in such manner as to provide for the movement of the cables backwardly and forwardly for variably elevating the trailing edges of the wings 13, 14, 15 and 16 to vary the angles of attack of the wings.

In order to operate the servo-motor in such manner as to actuate the cables 218, there is provided in the boss 233 inlet and outlet ports 240 and 241, respectively, which are connected respectively by conduits 242 and 243 to outlet and inlet ports 248 and 253 respectively of a rotary control valve 244. The valve 244 is secured in position within the interior of the casing 82 by an inwardly projecting bracket 245.

The control valve 244 consists of an annular cylindrical casing 246 having an annular cylindrical rotary member 260 disposed therein. Within the rotary valve member 260 is a second cylindrical rotary valve member 267, the two rotary members 260 and 267 being provided with cranks 286 and 275, respectively, by which the two members may be rotated with respect to one another and with respect to the valve casing 246. The lever 286 is pivotally connected by a rod 287 to a box 288 extending downwardly from the central portion of the head 241.

Assuming the bellows 232 to be filled with liquid, it will be apparent that any increase in the supply of liquid within the bellows 232 will move head 231 thereof downwardly and by reason of the linkage previously described will rotate the rotary member 270 in a counterclockwise direction. Conversely, any decrease in the supply of liquid within the bellows 232 will by reason of such linkage rotate the valve member 260 in a clockwise direction.

The arm 275 is connected by a rod 276 to the outwardly projecting arm of a rotary bracket 278, having a pin 280 engaging an annular channel 281 formed in the upper extremity of tubular control member 279 on which the bracket 278 is rotatably mounted. The lower end of control member 279 has an arm 282 attached thereto having a pin and slot connection to one end of a bell crank lever 283 secured upon a pin 284 projecting outwardly from support arm 137. The opposite end of the lever 283 is pivotally connected to a control rod 285 by the operation of which it will be apparent that the member 279 may be raised and lowered.

When the operator does raise and lower the rod 279 it will be apparent that the linkage between this rod and the rotary cylinder 278 will rotate the member 267 in clockwise or counterclockwise directions, respectively.

The valve outlet port 248, previously referred to, which communicates with the interior surface of the valve casing 246, is disposed adjacent one end of the casing and in a position diametrically opposite a valve inlet port 249 also communicating with the interior of the casing. Similarly the valve inlet port 253 is located adjacent the opposite end of the valve casing 246 and likewise communicates with the interior surface thereof. Also diametrically opposite the valve inlet port 253 is a similar port 254 communicating with the interior surface of the casing. The port 249 is adapted to be supplied with liquid under pressure by a conduit 250, the opposite end of which communicates with the discharge side of a pump 251 secured by a bracket to the interior of the casing 82. Similarly the port 254 is connected by a conduit 255, a tank 256 and a conduit 257 to the inlet side of pump 251. A drive shaft for the pump 251 is provided with a drive pinion meshing with the ring gear 97 and during the rotation of the engine 11 liquid under pressure will be continuously supplied to the port 249 by the conduit 250 and will be continuously exhausted from the port 254 by the conduit 255.

In order to provide means by which communication may be provided at the option of the vehicle operator, between the port 249 and the port 248 there is provided in the sleeve member 260 and the cylindrical member 267 ports 261, 262 and 268, respectively, all of which openings are formed diametrically within the members 260 and 267 in such manner as to be registerable with one another and to provide open communication between the ports 249 and 248 when such communication is desired.

Likewise the opposite end of member 260 is provided with diametrically opposed openings 265 and 266, and member 267 is provided with a diametrically extending opening 269, all of such openings being adapted to provide open communication between the ports 253 and 254 when desired.

It will be apparent from Fig. 10 that when the operator of the craft moves the actuating rod 285 in such manner as to rotate the valve member 267 to a slight extent in a counterclockwise direction, there will be provided by the openings 261, 262 and 268 an open communication between the discharge side of the pump 251 and the interior of the bellows 232. Accordingly liquid will be pumped by the pump into the bellows and as a result thereof the head end 231 of the bellows will be moved downwardly in such manner as to actuate the linkage for operating the member 260 to likewise rotate the member 260 in a counterclockwise direction. As a result of such rotation of the member 260 it is apparent that the fluid supply to the bellows 232 resulting from the previously described counterclockwise rotation of the member 267 will be cut off by the corresponding rotation of the member 260 and further downward movement of the head end 231 of the bellows 232 thereupon will be discontinued.

By referring now to Fig. 6 it will be apparent that the previously described downward movement of the head end 231 of the bellows 232 will actuate the cables 218 in such manner as to move the slide members 210 upwardly, thus increasing the compression of springs 206 and decreasing the compression of springs 207. As a result of this change in compression of the springs 206 and 207, the yokes 203 will be moved upwardly and consequently the trailing edge of the wings 213, 214, 215 and 216 will be simultaneously raised to decrease equally the angles of attack of all of the wings.

Referring again to Fig. 10 it will be apparent that if the operator actuates the rod 285 in such manner as to rotate the member 267 slightly in clockwise direction, the port 269 will be moved into a position into which it will register with ports 265 and 266, thereby connecting the outlet port 241 with the inlet side of the compressor 251 and as a result of which liquid will be pumped out of the bellows 232 to elevate the head 231. As a result of such elevation of the head 231 the linkage between the head and valve member 260 will operate in such manner as to rotate the member 260 in a clockwise direction to such an extent as to cut off the communication previously established between the bellows 232 and the pump 251 and consequently the contracting movement of the bellows will be discontinued.

By referring again to Fig. 6 it will be apparent that the previously described limited elevational movement of the head 231 of the bellows 232 will oppositely change the compression of springs 206 and 207 with respect to that previously described and as a consequence thereof the trailing edges of the wings 13, 14, 15 and 16 will be lowered, thus simultaneously and equally increasing the angles of attack of all of the wings.

In this manner and by the right amount of movement of actuating rod 285 in either direction the operator of the aircraft may position the wings 13, 14, 15 and 16 at any desired angle of attack with respect to the plane of rotation of the engine 11.

Referring now to Figs. 12 and 16, as well as to Fig. 6, it may be stated that the spars 194 are not positioned directly beneath the longitudinal center of pressure of the wings 13, 14, 15 and 16, as is ordinarily done in the construction of aircraft wings. Instead of such normal construction the spars 194 are positioned slightly forwardly of the longitudinal center of lift thereof. This is done to make inherent in the construction of the wings a slight tendency for the wings to rotate into positions of decreasing angles of attack as the loads on the wings increase. Conversely, with such construction the wings will tend to rotate into positions of increasing angles of attack as the loads on the wings decrease. By referring to Fig. 6 it will be apparent that the springs 206 and 207 will merely adjust themselves in a position to compensate for such tendency whenever the craft is merely moving vertically upwardly or downwardly and has no translatory motion with respect to the air. It will be apparent that under such circumstances there will be no tendency for the loads on the different wings to vary throughout each revolution of the engine 11.

However, there is a tendency for the loads on the different wings to vary during translatory flight of the aircraft. With the construction described, in which the spars 194 are positioned slightly forwardly of the longitudinal centers of pressure upon the wings, the springs 206 and 207 will tend to be compressed differently when the load on any wing tends to increase or to decrease. For example, the load on an advancing wing will tend to increase because the air speed affecting such a wing will be the air speed resulting from the rotational movement of the wing plus the air speed due to the translational movement of the wing. Such combination of air speeds upon such an advancing wing will tend to increase the lift of the wing. However, due to the fact that the spar of such a wing is disposed slightly forwardly of the longitudinal center of lift of the wing, this tendency to increase the load upon the wing will rotate the wing upon the spar in such manner as to decrease the angle of attack of such wing and under which circumstances such tendency to increase the load upon the wing resulting from such increase in air speed will all but disappear.

Conversely, the air speed over a retreating wing will be the air speed due to the rotational movement of the wing minus the air speed due to the translational movement thereof. This resultant reduction of air speed over such wing will tend to decrease the total load upon the wing, and, as previously described, to increase the angle of attack of the wing. This increase in angle of attack likewise will result in the disappearance of all but a tendency to decrease the total load upon the wing under such circumstances.

Referring now to Fig. 18, the numeral 310 is a curve indicating the performance of a wing which is particularly applicable to aircraft such as that herein described. According to this graph the wing is so designed in cross section that the lift upon the wing will increase in pounds per square foot as the air speed over the wing increases to the point where the slope thereof is zero at 450 miles per hour, and thereafter the lift per square foot upon the wing will decrease at exactly the same rate it had previously increased up to an air speed of 700 miles per hour over the wing. With such a wing the normal operating speed of the engine would be the number of revolutions per minute required to produce an average speed over the wing of 450 miles an hour (39,600 feet per minute) throughout one complete revolution. With four such wings applied to the present aircraft the lift in pounds per square foot upon each wing will be the maximum lift for the wing indicated in Fig. 18 by the line 311 at all times during vertical ascent or descent of the aircraft. However, with any translational movement the performance of each wing will vary as the descending portions of the curve 310 on opposite sides of the normal speed point at 450 miles per hour as its speed increased and decreased above the normal speed of 450 miles per hour. Under such circumstances the performance of all of the wings will be a combination of the maximum and minimum lift of any wing throughout each complete revolution of the engine, or as is indicated by the curve 312.

In order to start the engine 11 the aircraft operator merely actuates the engine starter in such manner as to rotate the shaft 187 and this will result in the rotation of the engine 11 in response to the operation of the starter drive pinion 191 in rotating the ring gear 192. With the wings 13, 14, 15 and 16 in their zero angle of attack position, which may be simultaneously brought about by the operation of the valve 244, as hereinbefore described, the engine will be easily accelerated to the normal starting speed, due to the fact that there is no load on the engine other than the drag of the wings at zero angles of attack and the slight frictional resistance involved in the operation of the bearing 86 by which the engine is supported.

With the valve piston 114 in the position indicated by Fig. 10 the operator will then slightly close the by-pass valve 148 by actuating the rod 170, thus supplying a quantity of fuel from the pump 95 to the cylindrical bore 113 of the distributing valve 112. This fuel will be intermittently supplied to the ports 117 by the ports 115 which receive fuel from the bore 114 through the axial passage 116. Under such circumstances each port 117 will communicate with each of the five ports 115 which will result in supplying to each of the engines 18, 19, 20 and 21 five separate charges of liquid fuel for each revolution of the engine 11. Since there are four equally spaced ports 117, this will result in supplying to all of the engines 18, 19, 20 and 21 twenty equally spaced charges of liquid fuel for each revolution of the engine 11.

Due to the fact that the orifices 36 will tend normally to remain closed by the spring pressed valves 39, it will be apparent that each of the charges of liquid fuel received by any of the engines 18, 19, 20 or 21 will tend to increase the amount of liquid fuel in the fuel supplying compartment of the valve body 31 of each engine which will result in the valves 39 opening slightly to discharge through the orifices 36 an amount of liquid fuel equal to each of the charges intermittently supplied to the ports 117. When such charges of fuel are intermittently supplied to the atomizing chambers 37, the charges will tend to be atomized by the orifices 36 and vaporized by the heating coils 61 to provide intermittent vaporized and atomized charges to the throats 57 of the venturis 58. Since the shutter valves 64 will have been forced open by the ram compression of air against the front ends of the engines 18, 19, 20 and 21, it will be apparent that the continuous flow of primary air through the venturis 58 will intermittently pick up these charges of vaporized and atomized fuel and will form intermittent charges of vaporized and atomized fuel and primary air in the portion of the venturis 58 adjacent the spark plugs 60. Assuming the spark plugs to have previously been energized, it will be apparent that these intermittent charges of primary fuel and air will be burned or exploded as they pass beyond the venturis 58 into the interior of the casings 30. Such intermittent burning of combustible charges in the casings 30 will result in the intermittent heating of the excess air received from the inlet passages of the casings and flowing into the casings around the outside of the venturis 58. Such intermittent combustion of combustible charges and heating of excess air will intermittently increase the pressure within the casings 30, and this will result in intermittently closing the shutter valves 64 and in discharging through the discharge openings of the casings a high velocity mass or jet consisting of the products of combustion and heated excess air, this being the working fluid in response to the discharge of which the engines 18, 19, 20 and 21 receive a thrust or reaction tending to move the engines forwardly and to rotate the engine 11. When this intermittent discharge of working fluid from the engines 18, 19, 20 and 21 commences, the acceleration in rotational movement of the engine 11 also commences, and thereafter the speed of rotation of the engine 11 will increase if desired until the capacity of the engines 18, 19, 20 and 21 operating as intermittent, pulse jet or resonance engines is reached. The engines 18, 19, 20 and 21 are so designed that when this speed of rotation of the engine 11 is reached the ram compression effect upon the inlet openings of the engines will be sufficient that the engines may thereafter be operated as continuous ram-jet engines (sometimes called athodyd).

To bring about this variation in operation the operator of the craft is merely required to actuate the rod 138 in such manner as to raise the valve piston 114 until the edge 122 of the annular opening 120 is just above the ports 117. In this position it is apparent that liquid fuel will be continuously supplied to the ports 117 throughout each rotation of the engine 11. Since liquid fuel is now being continuously supplied to the fuel chambers of the valve bodies 31, the valves 39 will now remain continuously open against the pressure of the springs 44 and liquid fuel will be continuously discharged into the atomizing chambers 38. Such discharge of fuel into these atomizing chambers will result in the formation of continuous combustible mixtures in the throats of the venturis 58 and in the continuous ignition of such charges beyond the venturis 58. The speed at which this continuous combustion of combustible charges may be brought about is any speed at which the ram compression effect of the atmosphere upon the front ends of the engines 18, 19, 20 and 21 is greater than the rate of flame propagation at which such charges are ignitable.

It will be apparent that engines 18, 19, 20 and 21 will be capable of developing a greatly increased thrust when so operated as continuous internal combustion engines due to the fact that the average pressure within the engines is at all times greater than it is possible to obtain when the engines are operated intermittently. As a result of continuous operation there is also a continuous reaction from the discharge of working fluid therefrom and this also is at all times the maximum that may be developed in engines of such size.

By operating the rod 285 to increase the supply of liquid fuel delivered by the pump 95 to the distributing valve 112, the operator may now increase the speed of rotation of the engine 11 until the engine is idling at any normal operating speed which it is desired to employ.

In order to fly the engine 11 in such manner as to raise the cabin 10 vertically off the ground, the operator is required merely to actuate the rods 170 and 285 to simultaneously increase the angle of attack of each wing and to supply a sufficiently increased amount of fuel to the distributing valve 112 so that the operating speed of the engine will remain constant under such increased load. As the angles of attack of the wings increase, the wing loading will increase until the total load sustained by all the wings exceeds somewhat the weight of the entire aircraft structure. Under such circumstances the craft will rise vertically off the ground.

In the event the operator of the craft may wish to turn the cabin 10 around so that the front end of the cabin will be pointed in a different direction, the operator will merely actuate the worm shaft 249a in one direction or another, thus tilting the vertical control member 290 upon the axis of the shaft 293. Under such circumstances the annular down draft or slip stream from the wings 13, 14, 15 and 16 will impinge against a surface disposed angularly with respect to the parallel currents of air within the slip stream, and as a result thereof the cabin 10 will be rotated slowly upon the bearing 87. When the cabin 10 reaches the desired position the operator will again actuate the worm shaft 294a to again dispose the control surface member 290 in its normal vertical position and in which position it is disposed in parallel relation to the currents of air so generated by the wings.

When the operator desires to start the translational movement of the aircraft, this is done by cyclic propulsion resulting from a further actuation of the rods 138 and 170. The rod 138 is actuated in such manner as to further elevate the valve piston 114 within the bore 113 to such an extent that the transversely disposed end surface 124 of the annular channel 120 cuts off at the same azimuth position a part of the communication for a part of each revolution or cycle between the annular channel 120 and the ports 117. Due to the slope of the surface 123 it will be apparent that the ports 117 will still fully communicate with the annular channel 120 at opposite azimuth positions during the remainder of each revolution or cycle. The rod 170 also is actuated simultaneously with the valve piston 114 in such manner as to further close the by-pass valve 148 to thereby increase the pressure and quantity of fuel delivered to the bore 113.

Under such circumstances it will be apparent that the engines 18, 19, 20 and 21 will successively receive more fuel from the distribution valve 112 during a part of a cycle of rotation of the engine 11 than they will during the remainder of the cycle. At the same time due to the increased pressure and quantity of fuel delivered to the bore 113 the engines may be made to receive as much or more fuel during such a cycle of rotation than was true when the ports 117 all received equal amounts of fuel through the annular port 120. As a matter of fact the piston 114, if the operator desires, may be further elevated until the surface 124 completely cuts off the flow of fuel through the ports 117 during a part of each cycle of rotation and at the same time the pressure and quantity of fuel delivered to the bore 113 may be increased by operating the by-pass valve 148 until a greater amount of fuel is delivered to the engines during a part of the cycle than was previously delivered when the ports 117 remained fully open throughout the cycle. It will be apparent that the cyclic propulsion of the engines 18, 19, 20 and 21 may be made to follow any desired pattern of variation between a minimum propulsion force at the zero degree position or azimuth points in a cycle and maximum propulsion force at the 180-degree position or azimuth point by making suitable variations in the distributing valve structure.

The performance of the engine 11 during these different extremes of operation is graphically illustrated in Fig. 17 where the area indicated by the numeral 171 illustrates the performance of the engine 11 when uniform quantities of fuel are delivered to all of the engines 18, 19, 20 and 21 during a single cycle of operations or revolution of the engine 11, and the area indicated by the numeral 172 illustrates such performance when variable quantities of fuel are delivered to the engines 18, 19, 20 and 21 during such cycle of of operations. From the area indicated by the numeral 171 it will be apparent that at zero degrees of each cycle of operations a certain quantity of fuel is delivered to all of the engines 18, 19, 20 and 21, and this same quantity of fuel is delivered to all of the engines during a complete cycle or 360 degrees of angular movement thereof. By observing the area indicated at 172 it will be apparent that at the beginning of a cycle or at zero degrees during each revolution no fuel at all may be supplied to the engines 18, 19, 20 and 21 as they successively pass through this portion of the cycle, but thereafter the fuel supplied to each of the engines 18, 19, 20 and 21 is increased until at the 180-degree position in the cycle each engine is successively supplied with a maximum quantity of fuel as is indicated by the top of the area 172. Thereafter the amount of fuel successively supplied to each engine again decreases until at the end of the cycle or the 360-degree position therei nthe fuel successively supplied to each engine 18, 19, 20 and 21 again becomes zero.

Referring now to Fig. 3 and assuming the engine 18 to be at the beginning or zero degree position in a cycle and the engine 15 to be at the middle or 180-degree position in the cycle, it is apparent that the engine would immediately tend to move toward the north, assuming the upper part of the drawing to represent this direction. This would result from the fact that the drag upon the wing 13 would not now be overcome by an equivalent thrust exerted by the engine 18, whereas the drag on the wing 15 would now be opposed by a thrust exerted by the engine 20 at least twice as great as was formerly applied in overcoming the drag opposing the wing 15. Under such circumstances the equilibrium of thrust and drag forces which occurred when equal amounts of fuel were being supplied to each engine during an entire cycle would be disturbed and the entire structure would tend to move translationally until such equilibrium of forces is reestablished. Such equilibrium will be reestablished when the drag upon all of the wings at the zero position in each cycle becomes zero, since the thrust of the engines in such position is zero and the drag upon all of the wings at the 180-degree position in the cycle becomes equal to the increased thrust of the engines when each successively reaches such position. Under such circumstances the engine 11 will actually tend to roll upon the air with each engine and wing unit tending to assume a relative speed of zero with respect to air at the zero position in each cycle of operations, and each engine and wing unit at the 180-degree position in each cycle will tend to travel at a relative speed with respect to the air twice as great as the linear or peripheral speed of each engine prior to the commencement of such translational movement. The translational speed of the axis of rotation of the engine 13 therefore will be equal to the linear or peripheral speed of the engine during purely rotational movement thereof minus the parasite drag resulting from the translational movement of the various parts of the aircraft other than the wings.

To illustrate this principle of translational motion by cyclic propulsion, assume the engine 11 to be rotating at a peripheral speed of 39,600 feet per minute or 450 miles per hour and that there is no parasite drag. Then with the fuel distributed to provide a zero propulsive effect at the zero position in the cycle and a maximum propulsive effect at the 180-degree position in the cycle, the relative translational speed of each successive portion of the engine at the zero position in the cycle would be zero feet per minute or zero miles per hour; at the 180-degree position, 79,200 feet per minute or 900 miles per hour; and at the center of rotation, 39,600 feet per minute or 450 miles per hour. This theoretical translational speed line therefore may be seen to be equal to the peripheral or linear speed of rotation. The parasite drag of course makes such theoretical speeds unattainable, consequently the translational speed at the zero position will be greater than zero feet per minute; and at the 180-degree position, less than twice the peripheral speed of rotation and that at the center of rotation, less than the peripheral or linear speed of rotation.

In order to change the direction of the translational movement so provided it is merely necessary for the operator to actuate the cable 141 to rotate the valve piston 114, as a result of which the zero position in each cycle of operations will be correspondingly changed. When this occurs, it will be apparent from the foregoing description, that the direction of application of the thrust forces exerted by the engines 18, 19, 20 and 21 will be likewise changed and the direction of translational movement of the engine 13 will change to agree with the establishment of this new angular position for the cycle of operations. During such change in direction the cabin 10 will merely rotate upon the bearing 17 until the forward end thereof points in such new direction of flight.

From the foregoing it will be apparent that the engine 11 due to the variable application of thrust forces internally thereof is inherently capable of both vertical and translational flight in any direction without the application of any controls whatever which might be located upon the cabin 10.

However, it is possible by controlling the gyroscopic effect inherent in the operation of engine 11 to bank turns in either direction against the solidity of the disc 12 and the wings 13, 14, 15 and 16 or to change the angle of incidence of the disc and wings in such manner as to dive or climb, as such maneuvers are performed by conventional aircraft.

For example, if the control surface member 295 is elevated, this will tend to exert a force against the axis of rotation of the engine 11 tending to move the lower part of the axis forwardly which, according to the clockwise direction of rotation disclosed by Fig. 3, will cause the axis of the engine to precess in such manner as to elevate the wing 13 and depress the wing 15. Likewise, if the control surface member 295 is depressed, this will tend to tilt the lower end of the axis of rotation of the engine 11 backwardly which will produce a resultant precession of the plane of the engine 11 to depress the wing 13 and elevate the wing 15.

Referring again to Fig. 1, it will be apparent, as has been heretofore described, that the control surface member 290 is within the annular slip stream from the wings as the aircraft moves vertically within the air and prior to any translational movement thereof. However, it will also be apparent from observing this figure that control surface member 290 will move forwardly out of the path of the annular slip stream from the wings when the aircraft attains a sufficient speed of translational movement. Under such circumstances the control surface member 290 will then move into the path of the slip stream resulting from the translational movement of the cabin 10 and particularly will be affected by that part of the slip stream which passes over the cabin and downwardly along the downwardly sloping surface at the rear of the cabin. If under such circumstances the control surface member 290 is rotated upon the axis 293, it will then present an angularly disposed surface to the downward portion of the slip stream over the cabin 10 and consequently the lower portion of the axis of rotation of the engine 11 will tend to be rotated in one direction or another and in a plane at 90 degrees with respect to the line of flight of the aircraft. Such tendency to rotate the axis of rotation of the engine 11 will immediately tend to produce a precessional movement of the axis of rotation in a plane 90 degrees with respect to the plane of the force applied to the axis and as a consequence thereof the plane of rotation of the engine 11 will tend to change its angle of incidence so as to cause the aircraft either to dive or to climb.

By operating the control surface members simultaneously it is possible to obtain any desired combination of these movements as is done in conventional aircraft.

In the event of any failure of power, it will be apparent that the wings 13, 14, and 15 may be so adjusted in angles of attack that autorotation of the engine will result. The lift, however, which can be obtained by the wings under such circumstances, and particularly at the greatly reduced speed at which they would then rotate, under some circumstances might be insufficient to land the craft safely. Also at such reduced speed of rotation the gyroscopic effect resulting from the rotation of the engine 11 would be decreased to such an extent that the control surface members 290 and 295 and the ailerons 303 may then be operated merely as a rudder and an elevator respectively is employed on an ordinary glider. Pursuant to this end and by proper manipulation of the control surface member 295 as an elevator, the craft may be made to have sufficient forward movement that the disc 12, notwithstanding its rotational movement resulting from the autorotation of the wings of the aircraft, may be positioned to provide an angle of incidence such that the disc will cease to perform as a neutral airfoil surface and will perform as a fixed wing of a glider type aircraft to aid the wings 13, 14, 15 and 16 in slowing the descent of the craft to provide a safer landing speed.

This application is a continuation of application Serial No. 606,013, filed July 19, 1945, for Aircraft, now abandoned.

What is claimed is:

1. A direct reaction engine comprising a body having an axis of rotation, a wall providing a chamber associated with said body, said wall having a discharge opening formed therein for the discharge of working fluid from said chamber, said opening being directed to discharge said working fluid tangentially with respect to a portion of said body for rotating said body by direct reaction on said axis, means for supplying working fluid to said chamber, means for heating said working fluid in said chamber, means for varying between maximum and minimum discharge rates at diametrically opposed azimuth points the discharge of said working fluid from said discharge opening for effecting a directional reaction upon said body transversely with respect to said axis of rotation, means for maintaining said variation in the discharge of working fluid from said discharge opening at said azimuth points throughout a complete range of loads and speeds for said engine, and means for changing said variation to different diametrically opposed azimuth points for changing the directional reaction upon said body for controlling the direction of movement of said body.

2. A direct reaction engine comprising a body having an axis of rotation, a wall providing a chamber associated with said body, said wall having a discharge opening therein for the discharge of working fluid from said chamber, said opening being directed to discharge said working fluid tangentially with respect to a portion of said body for rotating said body by direct reaction on said axis, means for supplying working fluid to said chamber, means for heating said working fluid, means for varying the heating of said working fluid between the same diametrically opposed azimuth points during successive revolutions of said body for effecting a directional reaction upon said body in the plane of rotation thereof in response to the discharge of working fluid from said discharge opening, and means for changing the direction of said reaction about said axis.

3. A direct reaction engine comprising a body having an axis of rotation, a support for said body having a bearing, said bearing being adapted to permit the rotation of said body on said axis, means for discharging working fluid from said body in tangential relation to a portion thereof for rotating said body upon said axis, means for heating said working fluid in said body, a valve associated with said support for controlling the discharge of said working fluid by said discharge means, said valve embracing means for effecting the continuous discharge of working fluid by said discharge means and means for cyclically varying between maximum and minimum discharge rates at diametrically opposed azimuth points the discharge of working fluid throughout each cycle of rotation of said body.

4. A direct reaction engine comprising a body having an axis of rotation, a support for said body having a bearing, said bearing being adapted to permit the rotation of said body on said axis, means for discharging working fluid from said body in tangential relation to a portion thereof for rotating said body upon said axis, means for heating said working fluid in said body, a valve associated with said support for controlling the discharge of said working fluid by said discharge means, said valve embracing means for effecting the continuous discharge of working fluid by said discharge means, and means for rotating said valve with respect to said support for changing the direction of translation of said body.

5. A direct reaction rotary translation engine comprising a body mounted for rotation about an axis, means for supporting said body for rotary and translatory motion in the plane of rotation of said body, a chamber associated with said body and having an exhaust passage leading from said body for discharging working fluid from said chamber in tangential relation to said body for rotating said body by direct reaction about said axis, means for supplying working fluid to said chamber in quantities sufficient to rotate said body about said axis control means including relatively rotatable means and disposed internally of said body and controlling said working fluid within said chamber to unequally discharge said working fluid through said exhaust passage on opposite sides of said axis and at the same azimuth points throughout successive revolutions of said body for applying directionally unbalanced rotational forces to said body for translating said body in the plane of rotation of said body, and means for varying the difference between said unequally discharged working fluid for varying the translatory force effecting said body.

6. A direct reaction rotary translation engine comprising a body mounted for rotation about an axis, means for supporting said body for rotary and translatory motion in the plane of rotation of said body, a chamber associated with said body and having an exhaust passage leading from said body for discharging working fluid from said body in tangential relation to said body for rotating said body by direct reaction about said axis, means for supplying working fluid to said chamber in quantities sufficient to rotate said body about said axis, relatively rotatable means for unequally discharging said working fluid through said exhaust passage on opposite sides of said axis and at the same azimuth points throughout successive revolutions of said body for applying directionally unbalanced rotational forces to said body for translating said body in the plane of rotation of said body, means for varying the difference between said unequally discharged working fluid for varying the translatory force effecting said body, and means for changing the azimuth relation of said azimuth points about said axis of said body and with respect to said supporting means for changing the direction of translation of said body.

7. A direct reaction engine comprising a self rotatable body having atmospheric air inlet and tangently directed exhaust opening means formed therein, said inlet and exhaust opening means having continuous working substance confining passage means extending therebetween, direct reaction, fuel burning, power generating means operatively disposed wholly within said body and in said continuous working substance passage means, said passage means comprising an air compressor supplied with air through said inlet and operable for increasing the pressure of such air and supplying the same under increased pressure for combustion to said power generating means, said power generating means being operable to generate and discharge working substance through said exhaust opening means so as to provide the requisite motive power for rotating and translating said body by direct reaction at all times during operation of the engine, and cyclic control means having different positions relative to the rotation of said exhaust opening means and being operable for effecting translation of said body in the plane of rotation of said body, said cyclic control means in one of said positions being operable to vary the discharge of all of said working substance discharged by said exhaust opening means during each revolution of said body to discharge said substance successively through all of said exhaust opening means at the same rates on the same sides of a plane through the axis of rotation of said body but at different rates on opposite sides of said plane and throughout successive revolutions of said body and the operating range of speeds and loads for said engine.

8. A direct reaction engine comprising a self rotatable body having inlet and tangently directed exhaust opening means formed therein, said inlet and exhaust opening means having continuous working substance confining passage means extending therebetween, direct reaction, fuel burning, power generating means operatively disposed wholly within said body and in said continuous working substance passage means, said passage means comprising an air compressor supplied with air through said inlet and operable for increasing the pressure of such air and supplying the same under increased pressure for combustion to said power generating means, said power generating means being operable to generate and discharge working substance through said exhaust opening means so as to provide the requisite motive power for rotating said translating said body by direct reaction at all times during operation of the engine, said direct reaction means including means for heating said working substance throughout the greater part of each revolution of said body, and cyclic control means having different positions relative to the rotation of said exhaust opening means and being operable for effecting translation of said body in the plane of rotation of said body, said cyclic control means in one of said positions being operable to vary the discharge of said working substance during each revolution of said body to discharge said substance successively through all of said exhaust opening means at the same rates on the same sides of a plane through the axis of rotation of said body but at different rates on opposite sides of said plane and throughout successive revolutions of said body and the operating range of speeds and loads for said engine.

9. A direct reaction engine comprising a rotatable body having inlet and tangentially directed exhaust opening means formed therein, said inlet and exhaust opening means having continuous working substance confining passage means extending therebetween, direct reaction means operatively disposed in said continuous passage means and being operable to discharge working substance through said exhaust opening means for rotating said body, heating means for said direct reaction means, means for operating said heating means for heating said working substance throughout successive and complete revolutions of said body, and cyclic control means having different positions relative to the rotation of said exhaust opening means and being operable for effecting translation of said body in the plane of rotation of said body, said cyclic control means in one of said positions being operable to vary the heating of said working substance in said direct reaction means during each revolution of said body to heat said direct reaction means at the same rates on the same sides of a plane through the axis of rotation of said body but at different rates on opposite sides of said plane and throughout successive revolutions of said body and the operating range of speeds and loads for said engine.

10. A direct reaction rotary translation engine comprising a rotatable body which at all times during the operation of the engine is rotated and translated by power generated within the body and having tangently directed exhaust opening means formed therein, thrust developing means disposed wholly within said body and operable for rotating said body to generate working substance at a distance from the axis of rotation of said body and to discharge said working substance through said exhaust opening means at rates changing with the rotation of said body to provide by direct reaction and in the plane of rotation of said body the rotary and translatory thrust required to rotate and translate said body at uniform rates and throughout a complete range of loads and speeds for said engine, and cyclic control means for said thrust developing means and being operable for effecting translation of said body, said cyclic control means being operable in timed relation to the rotation of said body to control the discharge of said working substance by said exhaust opening means to vary the thrust developed by said thrust developing means to provide different thrusts on opposite sides but the same thrust on the same side of the axis of rotation of said body and throughout successive revolutions of said body and said complete range of loads and speeds for said engine.

11. A direct reaction engine as defined in claim 10 and in which said thrust developing means comprises ram jet combustor means having inlet opening means for said working substance leading said exhaust opening means in the orbit of rotation of said exhaust opening means, said inlet opening means and said exhaust opening means being connected to one another by passage means extending therebetween along the orbit of said exhaust opening means.

12. A direct reaction engine as defined by claim 10 and in which said thrust developing means comprises pulse jet means extending along the orbit of said exhaust opening means and having inlet opening means leading to said exhaust opening means, said inlet opening means being provided with intermittently operable shutter means for admitting working substance to said pulse jet means.

13. A direct reaction engine as defined by claim 10 and in which said thrust developing means comprises chamber means extending along the orbit of said exhaust opening means and having inlet opening means leading said exhaust opening means, said inlet means being provided with centrally disposed valve body means forming annular inlet opening means within said inlet opening means, said body means being of streamlined formation and projecting forwardly within said inlet opening means.

14. A direct reaction engine comprising a rotatable body which at all times during the operation of the engine is rotated by power generated within the body and having tangently directed exhaust opening means, direct reaction means operatively disposed wholly within and rotatable with said body, said direct reaction means being arranged and operable to generate working substance at a distance from the axis of rotation of said body and to discharge said working substance through said exhaust opening means at rates per revolution great enough to provide the requisite motive power for rotating and translating said body by direct reaction at all times during operation of the engine in the plane of rotation of said body and throughout an operating range of speeds and loads for said engine, cyclic control means having different positions relative to the rotation of said exhaust opening means, said cyclic control means in one of said positions being adapted to vary the discharge of said substance through said exhaust opening means during each revolution of said body to discharge said substance successively through all of said exhaust opening means at the same rates on the same sides of a plane parallel to the direction of translation of said body and through the axis of rotation of said body but at different rates on opposite sides of said plane and throughout successive revolutions of said body and said operating range of speeds and loads for said engine, said direct reaction means including means for heating said working substance on opposite sides of said plane through said axis.

15. A direct reaction engine comprising a rotatable body which at all times during the operation of the engine is rotated by power generated within the body and having tangently directed exhaust opening means formed therein, power generating means wholly within and rotatable with said body and operable throughout successive and complete revolutions of said body and having the capacity to discharge a working substance from said opening means at rates per revolutions great enough to provide the requisite motive power for rotating and translating said body in the plane of rotation of said body and throughout an operating range of speeds and loads for said engine, and cyclic control means adjacent the axis of said body and having different positions relative to the rotation of said opening means, said cyclic control means in one of said positions being operable to vary the power developed by said power generating means during each revolution of said body to discharge said substance successively through all of said opening means at the same rates on the same sides of a plane through the axis of rotation of said body but at different rates on opposite sides of said plane and throughout successive revolutions of said body and said operating range of speeds and loads of said engine.

16. A direct reaction rotary translation device comprising a body mounted for rotation about an axis, means for supporting said body for rotary and translatory motion in the plane of rotation of said body, a chamber associated with said body and having an exhaust passage disposed in tangential relation to and in the plane of rotation of said body and terminating at a trailing edge of said body in an exhaust opening formed and positioned to discharge a working substance from said body in the plane of rotation of said body for rotating and translating said body, said exhaust passage and said opening being uniformly disposed and positioned relative to said body and said exhaust opening having the same area, throughout successive and complete revolutions of said body and the rotation and translation thereof, means operable for supplying working substance to said chamber in quantities sufficient to provide the requiste motive power for rotating and translating said body by direct reaction and in the plane of rotation of said body, and translation control means disposed wholly within said body and out of the slip stream around said body and exhaust passage and controlling said working substance discharged by said exhaust passage to unequally discharge said working substance on opposite sides of said axis and to similarly discharge said working substance at the same azimuth points throughout successive revolutions of said body.

17. A direct reaction rotary translation device as defined by claim 16 and in which means is provided for moving a part of the translation control means with respect to said supporting means for changing the direction of the translatory thrust resulting from the discharge of said working substance from said body.

18. A direct reaction rotary translation device comprising a body mounted for rotation about an axis, means for supporting said body for rotary and translatory motion in the plane of rotation of said body, a chamber associated with said body and having an exhaust passage leading from said body for discharging working fluid from said body in tangential relation to said body for rotating said body by direct reaction about said axis, means for supplying working fluid to said chamber in quantities sufficient to rotate said body about said axis, relatively rotatable control means for unequally discharging said working fluid through said exhaust passage on opposite sides of said axis and at the same azimuth points throughout successive revolutions of said body to effect the translation of said body in the plane of rotation of said body, and means for changing the setting of said control means with respect to said supporting means so as to shift the discharge cycle of said working fluid for changing the direction of translation of said body.

19. A rotary translation engine comprising a rotatable body, power generating means within and rotatable with said body and having tangently directed thrust applying means disposed in said body at a distance from the axis of rotation of said body and operable by said power generating means to apply to said body the total thrust required to rotate said body and to continue the rotation of said body at a uniform rate throughout successive revolutions of said body, cyclic control means having an operative position for controlling said thrust applied to said body to apply said thrust to a greater extent on one side than on the opposite side of the axis of rotation of said body and to the same extent on the same side of the axis of rotation of said body throughout successive revolutions of said body, said power generating means and said thrust applying means being operable by said cyclic control means in said position to apply to said body in a plane intersecting the axis of rotation of said body the total thrust required to translate said body and to continue the translation of said body at a uniform rate throughout successive revolutions of said body.

References Cited in the file of this patent
UNITED STATES PATENTS

| Number | Name | Date |
|---|---|---|
| 1,021,521 | Héroult | Mar. 26, 1912 |
| 1,305,340 | Bostedo | June 3, 1919 |
| 1,375,601 | Morize | Apr. 19, 1921 |
| 1,643,862 | Travnicek | Sept. 27, 1927 |
| 1,819,863 | Bleecker | Aug. 18, 1931 |
| 1,854,615 | Lasley | Apr. 19, 1932 |
| 1,932,702 | Langdon | Oct. 31, 1933 |
| 1,982,969 | Stalker | Dec. 4, 1934 |
| 2,045,623 | Wilford | June 30, 1936 |
| 2,108,839 | Wilford et al. | Feb. 22, 1938 |
| 2,220,066 | Cornell | Nov. 5, 1940 |
| 2,335,005 | Gieskieng et al. | Nov. 23, 1943 |
| 2,371,687 | Gerhardt | Mar. 20, 1945 |
| 2,397,357 | Kundig | Mar. 26, 1946 |
| 2,457,936 | Stalker | Jan. 4, 1949 |
| 2,462,587 | Wilcox | Feb. 22, 1949 |
| 2,514,749 | Dobbins | July 11, 1950 |